Dec. 30, 1969   R. LACROIX ET AL   3,486,978
PRESTRESSED CONCRETE PRESSURE VESSEL
Filed Oct. 24, 1966   4 Sheets-Sheet 1

United States Patent Office 3,486,978
Patented Dec. 30, 1969

3,486,978
PRESTRESSED CONCRETE PRESSURE VESSEL
Roger Lacroix, Sceaux, and Jean Pierre Magnas, Paris, France, assignors to Societe Generale d'Exploitations Industrielles (S.O.G.E.I.), Paris, France
Filed Oct. 24, 1966, Ser. No. 588,989
Claims priority, application France, Oct. 29, 1965, 36,786
Int. Cl. G21c 13/00; E04c 5/10
U.S. Cl. 176—65      7 Claims

ABSTRACT OF THE DISCLOSURE

A prestressed concrete pressure vessel has a monolithic concrete body of inner and outer layers. These layers are prestressed to provide an abrupt increase of prestress from the inner to the outer layer at the boundary between the layers.

---

This invention relates to a prestressed concrete vessel forming a containment shell which is subjected to high pressure and temperature, especially for gas-cooled nuclear reactors, and further relates to a method of construction of a vessel of this type.

Prestressed concrete pressure vessels are coming into increasingly wider use as containment structures for providing resistance to coolant pressure in nuclear reactors. It is an acknowledged fact that vessels of this type have a large number of advantages over pressure vessels of welded steel construction. One of the main advantages lies in the fact that, in principle, this structural design does not entail any limitation either in thickness or volume.

The object of prestressing is to subject the concrete vessel to overall compression and to prevent the development of tensile stresses in the concrete when the vessel is pressurized. However, irrespective of the arrangement of the steel prestressing cables, the stresses developed as a result of prestressing of a shell structure will progressively decrease from the internal wall to the external wall of the structure. Moreover, under operating conditions, a reactor containment vessel is subjected to two types of stresses which result in different stress distributions:

The internal pressure, whereby tensile stresses which are generated by said pressure throughout the thickness of the vessel wall are of increasing magnitude from the exterior to the interior of said wall and can therefore be counteracted by prestressing within the concrete structure;

The thermal gradient, which is practically inevitable and generates compressive stresses in the inner portion of the structure and tensile stresses in the outer portion of the structure.

Inasmuch as the second factor is preponderant, the curve of ultimate stresses as a function of the radius develops maximum tensile stresses in the outer wall. In order to balance the maximum tensile stresses, it therefore proves necessary to establish a prestress which is higher throughout the structure than the design assumes, except along the outer wall. As a consequence, this requirement in turn makes it necessary to provide a volume of concrete and a weight of reinforcement which attain impressive values in the case of high-power and high-pressure reactors of the type at present under construction or under design. By way of example, in the case of a 500 mwe. reactor of the natural-uranium fuelled, graphite-moderated and carbon-dioxide gas cooled type with integrated heat exchanger, the concrete structure attains a thickness of 5.50 m. and the weight of reinforcement is of the order of 4500 metric tons.

The aim of the present invention is to provide a prestressed concrete pressure vessel which meets practical requirements more effectively than comparable structures of the prior art, especially insofar as local stresses are better proportioned to the stresses which are to be expected during operation.

With this object in mind, the invention proposes a prestressed concrete pressure vessel wherein at least part of the wall structure comprises a plurality of concentric concrete layers which are bonded to each other and provided with means for subjecting said layers to prestresses of increasing magnitude from each layer to its adjacent outer layer.

In other words, as a result of the division of the vessel into a plurality of concentric concrete layers which are subjected to separate prestresses then rendered monolithic, it is possible to obtain a prestress which is still of decreasing magnitude within each concrete layer from the inner face to the outer face thereof but which increases in value from each concrete layer to the next in the outward direction. The layers can of course be formed of different materials: for example, the innermost layer can be fabricated of special concrete or any other material such as "silicalcite" which has insulating properties. Said innermost layer can be replaced by all or part of the heat-insulating material which is normally provided.

The invention further consists of other arrangements which are preferably employed in conjunction with those mentioned above but which can be utilized separately. These arrangements will become more readily apparent from a perusal of the following description of modes of execution of the invention which are given by way of example and not in any limiting sense. Reference is had in the description to the accompanying drawings, in which:

FIG. 1 is a diagram which represents the horizontal stresses which are induced by the internal pressure and the thermal gradient, said stresses being developed in a cylindrical prestressed concrete vessel having a vertical axis and of conventional design, and also represents the prestress which is necessary in order to balance said horizontal stresses;

FIG. 2, which is similar to FIG. 1, shows the stresses in a pressure vessel comprising two concrete layers in accordance with the invention;

Figure 4:
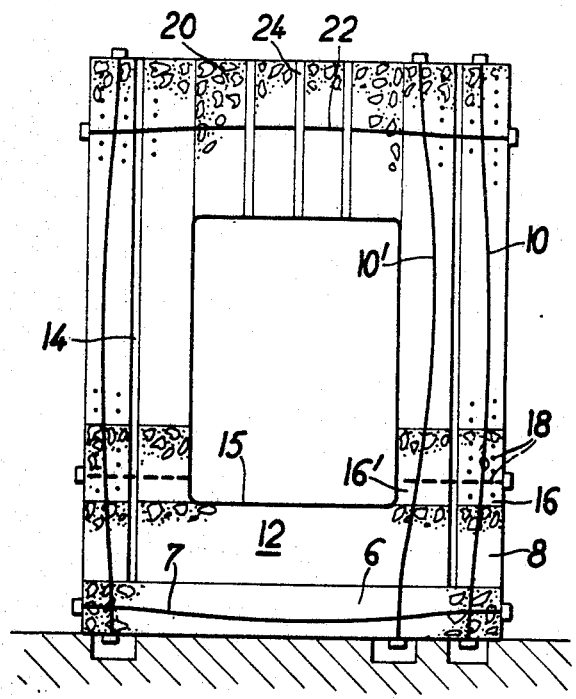
FIG. 4 is a diagrammatic sectional view along the vertical mid-plane of a cylindrical pressure vessel comprising two concrete layers in accordance with a first form of execution of the invention.
Figure 5:
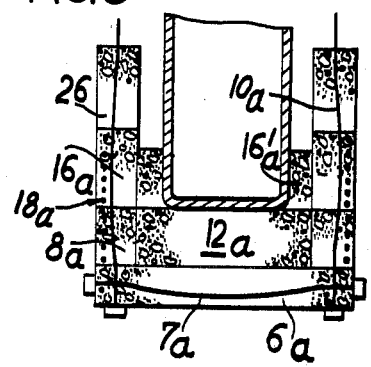
Figure 6:
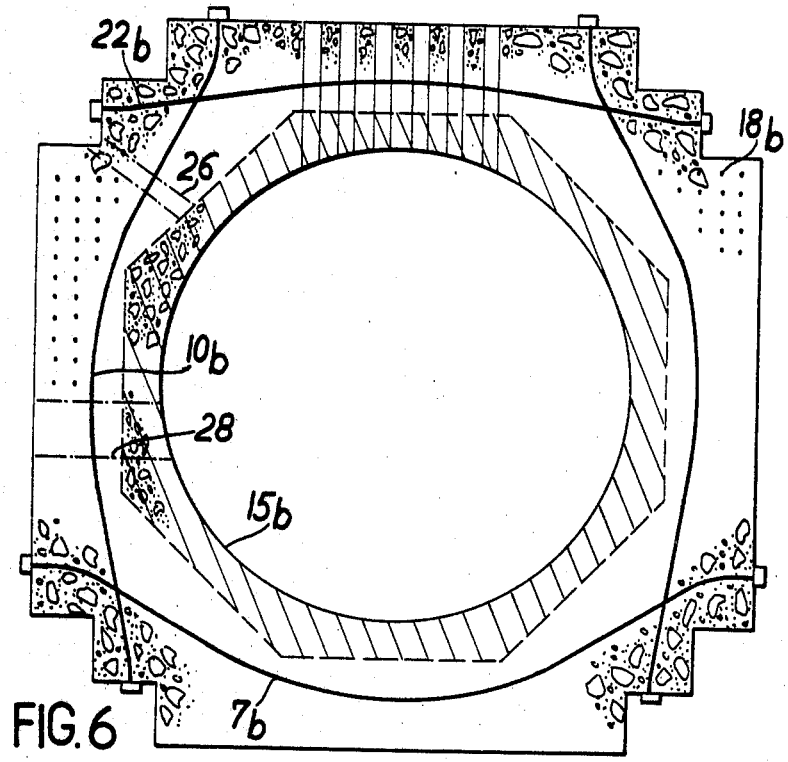
Figure 7:
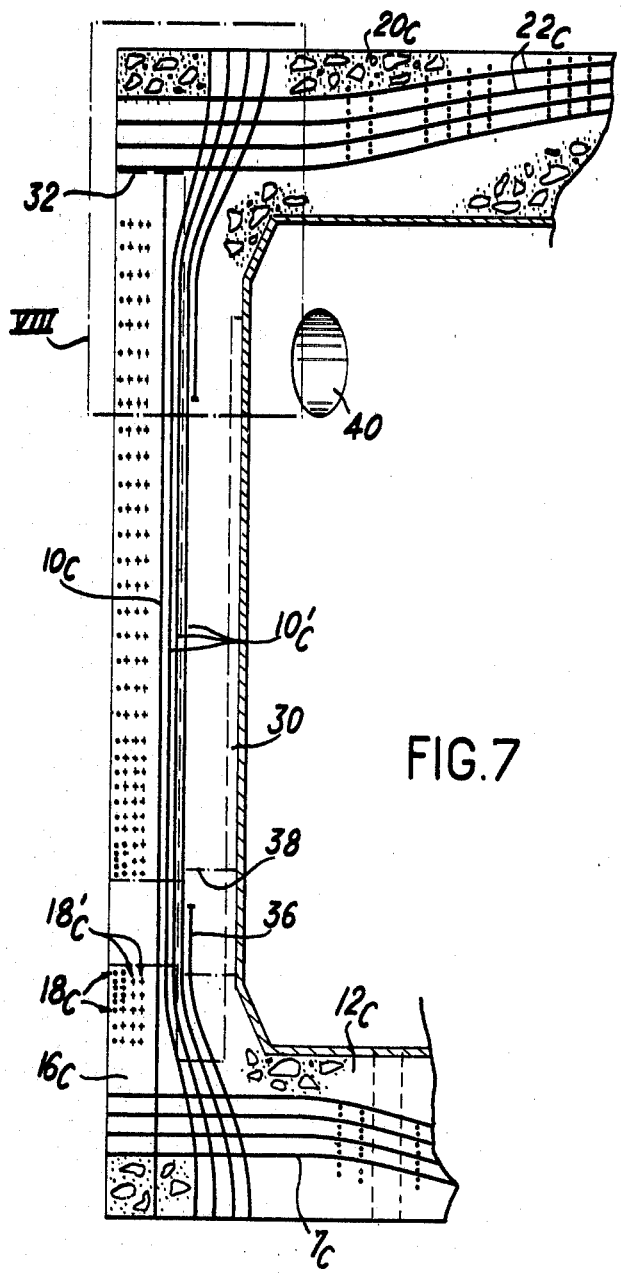
Figure 8:
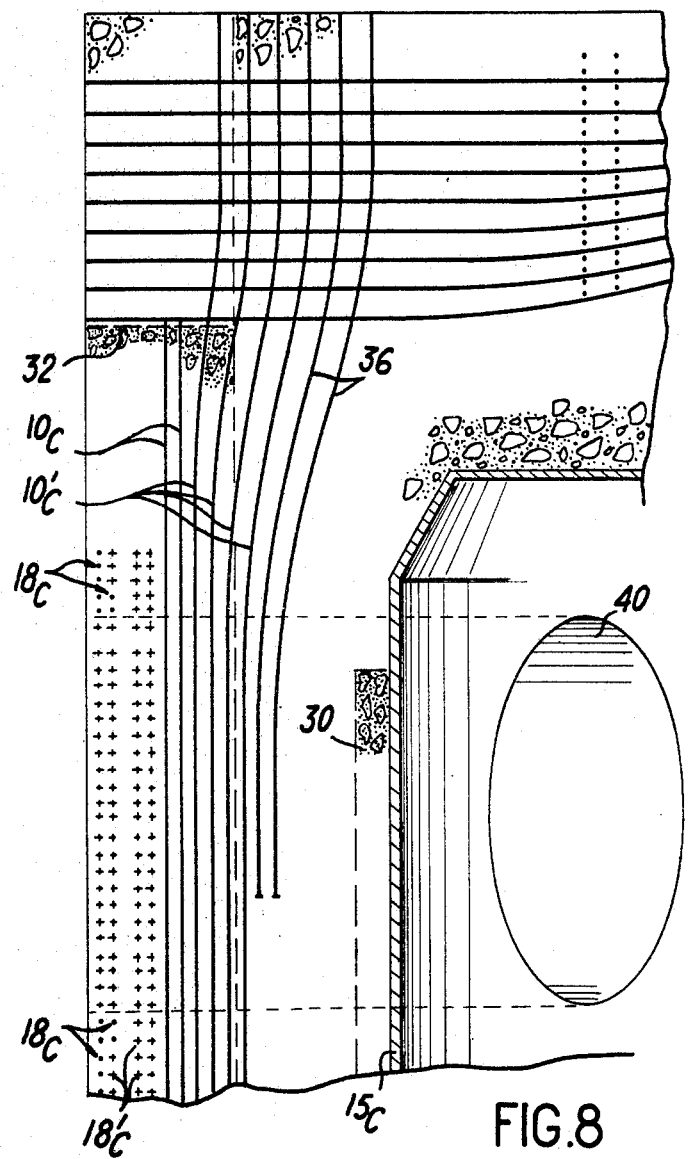

FIG. 5, which is similar to the lower portion of FIG. 4, illustrates an alternative form of execution;

FIG. 6, which is similar to FIG. 4, shows a hemispherical pressure vessel constituting another form of execution of the invention;

FIG. 7 is a diagrammatic half-sectional view along the vertical mid-plane of a pressure vessel as constructed in accordance with another mode of execution of the invention in which, for the sake of greater clarity, the portions which are placed during fabrication of the outer concrete layer and inner concrete layer have been separated by broken lines;

FIG. 8 is an enlarged view of the rectangular portion of FIG. 7 which is delimited by a chain-dotted line and designated by the reference VIII.

Figure 1:
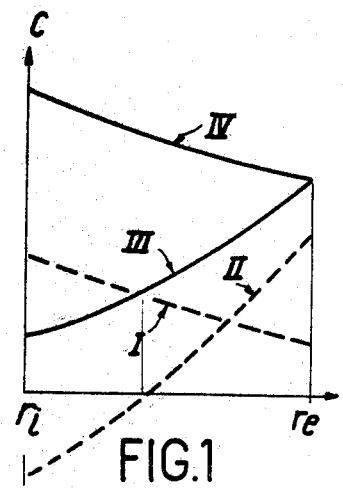

The broken lines of FIG. 1 show the distribution of horizontal stresses C which are generated by the pressure (curve I) and by the thermal gradient (curve II) in the lateral annular wall of a cylindrical pressure vessel having a vertical axis and an internal radius $r_i$ and external radius $r_e$, and the total stresses to be counterbalanced (curve III) when the vessel is at pressure and subjected to a thermal gradient. When the vessel is of conventional constructional design, prestressing forces must be developed prior to pressure loading so as to balance the maximum tensile stress once the vessel is under pressure and subjected to a thermal gradient, thereby resulting in a distribution of prestresses according to curve IV, from which it is apparent that excess precompression is established throughout the structure, except in the zones which are located near the outer wall of the vessel.

Figure 2:
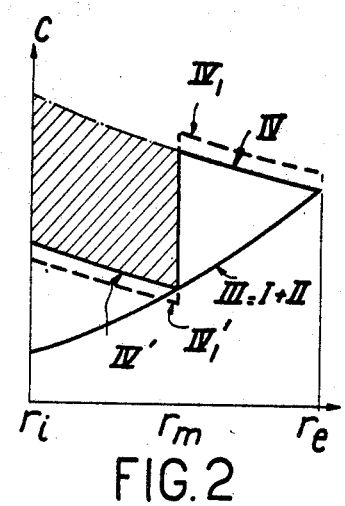

FIG. 2 shows very diagrammatically the result which may in principle be obtained in a containment vessel according to the invention which is made up of two concrete layers, wherein the prestresses in the outer concrete layer have the same distribution and the same values as in the previous case whereas, in the inner concrete layer, the prestress applied to the outer wall (curve IV') is restored to the value which balances the stress produced both by the pressure and the thermal gradient. Thus the magnitude of the prestress exhibits an abrupt increase from the inner to the outer layer at the boundary therebetween. The shaded area gives an indication of the economy which is achieved as regards the tendons. In fact, in order to take into account the danger of creep, it is preferable to increase the value of prestress in the outer concrete layer to a slight extent, thereby raising curve IV to position $IV_1$ and, on the contrary, to reduce the prestress in the inner layer (curve $IV'_1$): the progressive variation of stresses in time prior to commissioning of the reactor results in curves IV and IV'.

Figure 3:
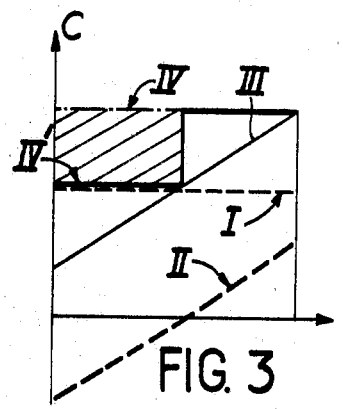
FIG. 3 shows the vertical stresses in a pressure vessel comprising two concrete layers in accordance with the invention.

FIG. 3 shows the result achieved in the case of stresses produced at right angles to the axis of a cylindrical vessel: in this case, curve I is parallel to the axis, the stresses induced by the internal pressure being constant.

Obviously, provision could be made for more than two concrete layers for the purpose of bringing the stress curve even closer.

Referring to FIG. 4, there will now be described by way of example a method of construction which can be adopted for the purpose of fabricating a vertical cylindrical pressure vessel for nuclear reactors which is cooled by a circulation of gas under pressure and the walls of which are constituted by two layers of concrete.

The initial operation consists in placing a bottom concrete platform 6, the surface of which as viewed in plan corresponds to the entire transverse cross-sectional area of the pressure vessel and which is provided with throughtubes or cable ducts for accommodating the horizontal and vertical prestressing cables. The horizontal prestressing cables 7 (hoops or cables disposed in star formation) are placed in position, then subjected to tension so as to apply a partial prestress to the bottom platform 6 as soon as this latter has acquired sufficient hardness.

An annulus 8 is then placed above the bottom platform 6 and has a thickness corresponding to the remainder of the total design thickness of the lower end wall structure, the external diameter of said annulus 8 being equal to the external diameter of the vessel and the radial dimension thereof being equal to the intended radial dimension of the outer concrete layer. Placement of the annulus 8 is carried out practically at the same time as partial prestressing of the bottom platform 6.

The tubes or ducts for accommodating the vertical prestressing cables 10 which are associated with the outer concrete layer obviously extend through the annulus 8. The internal shuttering of the annulus 8 is advantageously provided on two faces so that placement of the slab 12 which corresponds to the remainder of the lower end wall structure can be carried out immediately after placement of the annulus 8. The annular space 14 can vary between a radial width of a few millimeters (should a servicing passageway for personnel not be considered necessary) and a radial width of more than one meter. When conventional double-walled shuttering is employed, a space of at least ten centimeters is necessary.

Provision can be made for additional horizontal cable ducts both in the annulus 8 and the slab 12 or, alternatively, reliance can be placed on the cables which are mounted in the bottom concrete platform 6 for the purpose of prestressing the complete lower end wall structure.

The lining membrane 15 which will subsequently serve as shuttering for the inner concrete layer is then placed in position together with heat insulating material (if provided) and the tubes through which a liquid is circulated for cooling the vessel wall. The bottom steam-water tube shuttering assembly which is formed by the bottom penetrations and the lower end of the lining membrane can be placed in position as soon as construction of the platform 6 is completed. Assembly of the lining membrane can also proceed in conjunction with the construction of the lateral wall provided, of course, that it is kept ahead of the concreting. The general sequence of construction entails a repetition of the following cycle of operations:

Placement of one annulus of the outer concrete layer such as the annulus 16;

Placement of one annulus of the inner concrete layer such as the annulus 16' (an annular space 14 being maintained);

Application of partial prestress to the horizontal prestressing cables such as the cables 18 which are positioned within the annulus 16 (the two annuli 16 and 16' being maintained in independent relation and separated by the annular space 14).

The lateral wall is thus built up to the level of the top face of the vessel structure while naturally continuing to make provision for the vertical prestressing-cable ducts. It is usually an advantage to provide all of the horizontal prestressing cables in the outer concrete layer in order to facilitate placement of the inner layer, although there is nothing to prevent the arrangement of some of the cable ducts within the inner layer. A partial vertical prestress can then be applied by tensioning the vertical cables such as the cable 10 which are positioned in the outer concrete layer as constituted by the juxtaposition of the annuli 16.

The bonding of two annuli is then effected by filling the space 14; this operation does not introduce any delay in the construction program in view of the fact that it can be carried out at the same time as the insertion inside the lining membrane 15 (to which the upper end wall or section has not yet been joined) both of the reactor proper (including the diagrid, moderator stack and so forth) and also of the heat exchangers if such a design is contemplated.

The bonding operation is immediately followed by prestressing of the inner concrete layer. This operation is carried out:

In the case of horizontal prestresses, by increasing the tension of the cables 18 and/or by applying tension to the additional cables (not shown) which duplicate the first cables.

In the case of vertical prestresses, by increasing the tension of the cables 10 and/or by applying tension to additional cables such as the cable 10' which duplicate the first cables.

Finally, the lining membrane 15 is closed by fitting its top section in position and the upper end slab 20 is then placed, the cable ducts and also the horizontal prestressing cables 22 being in position and the penetrations 24 being provided. As soon as the upper end slab 20 has attained a sufficient degree of hardness, the total value of prestress is applied to the cables 22. Prestressing of either all or part of the inner concrete layer can also be carried out when the top slab 20 has been placed, at the same time as the application of tension to the cables 22. The mode of construction which has just been described makes it possible to form the bottom end wall structure and the lateral wall in two layers. The same result can be achieved by constructing the entire outer concrete layer (except for the top outer annulus) in a first stage. When the strength of the concrete of said outer layer is sufficient, some of the cables 7, 10 and 18 are subjected to tension so as to attain the requisite degree of prestressing (it being assumed that said outer concrete layer contains all of the horizontal cables, which is not essential but does facilitate placement of the inner layer).

The inner concrete layer is then placed whilst the outer layer serves as outer shuttering, and additional shuttering is provided only for the internal wall of said inner concrete layer. When the concrete of the inner layer has acquired sufficient strength, an additional prestress is then exerted and is applied this time throughout the thickness of the vessel. The second prestress just referred-to corresponds to curve IV', and the total value of the first prestress and of the second prestress correspond to curve IV.

The vessel can be constructed of a number of concrete layers which may be greater than two. In that case, instead of employing conventional shuttering for the purpose of providing a temporary separation between layers, it would prove particularly advantageous to make use of a rigid partition of small thickness and formed of a material which can be destroyed by chemical attack by a reagent or solvent which does not attack the concrete.

Another variant of the method which makes it permissible to utilize the invention only for horizontal prestressing (and not for horizontal prestressing combined with vertical prestressing as in the example hereinabove described) is illustrated diagrammatically in FIG. 5 which shows the concrete pressure vessel suring construction. In an initial step, the bottom concrete platform 6a is placed, followed by the annulus 8a; when the prestressing cables 7a have been put under partial tension, the slab 12a is then placed in its turn but without forming an annular space between said slab 12a and the annulus 8a, thus dispensing with the need of shuttering. The lateral wall is then constructed in lifts of successive annuli, the following cycle being repeated after placing a first outer annulus 16a and partial prestressing of said annulus:

Placement of an outer annulus 26 above the annulus 16a and placement of an inner annulus 16'a which does not come up to the level of the outer annulus 26 and which can make use of the adjacent outer annulus 16a as shuttering.

Partial prestressing of the annulus 26 and total prestressing of the annuli 16a and 16'a.

There is thus established the curve IV' of FIG. 2, but not the curve of FIG. 3 inasmuch as the vertical prestresses are applied by putting the cables 10a under tension once all the annuli have been completed.

The invention is applicable not only to cylindrical vessels but also to vessels of any other shape. By way of example, FIG. 6 shows a vessel which forms a spherical chamber constructed in two layers, the inner layer being shown in hatchings and delimited by a broken line. In this case, the method of execution consists in the complete construction of the outer concrete layer, the development of partial prestress in said outer layer by applying tension to the cables such as 7b, 10b, 22b and 18b (only a small number of which is shown), the placing of the inner concrete layer as delimited by the outer concrete layer which has already been built and by the lining membrane, and the application of total prestress. In order to facilitate the construction of the inner shutters of the outer layer, the boundary is preferably not spherical but constituted by a series of flat portions, conical portions and cylindrical portions (the cylindrical portions can be faceted). The placement of the inner concrete layer or of the space formed between the two layers can then be effected by means of passageways such as the passageway 26 which are formed for this purpose. The lateral penetrations 28 (circulator duct openings) are advantageously placed so as to open into the cylindrical portions or faceted portions of the boundary between the concrete layers.

The mode of execution which is shown in FIGS. 7 and 8 has an advantage over that of FIG. 4 in that it provides greater ease of construction and dispenses with any need to form a space between the two concrete layers while nevertheless providing a pressure vessel with a lateral wall made up of two layers which are subjected to different vertical stresses, which is not the case of FIG. 5.

For greater simplicity, the positions of the horizontal and vertical prestressing cables shown in FIG. 7 are only approximate and the number of cables appearing in the figure is smaller than the actual number employed. In addition, the cables employed for horizontal prestressing (radial prestressing) of the lateral wall are represented by dots when they are intended to effect the first-stage prestressing (as applied to the outer concrete layer alone) and by crosses when said cables are intended to effect the second-stage prestressing (as applied to both concrete layers bonded together).

The process of construction of the vessel shown in FIG. 7 is as follows: the lower end wall structure $12_c$ of the vessel is first placed in accordance with a process which is identical with the method employed in conventional pressure vessels by fitting horizontal prestressing cables $7_c$ together with the cable ducts which are intended to accommodate the first-stage vertical prestressing cables $10_c$ and second-stage vertical prestressing cables $10'_c$. The lower tube-support block (not shown) is evidently embedded in said lower end wall structure and serves to provide passageways for the water and steam ducts which are connected to the heat exchanger. The underface of the lining membrane $15_c$ need only be positioned when construction of the lower end wall is completed. The outer concrete layer is then placed progressively in annuli such as the annulus $16_c$. At the same time, the lining membrane $15_c$ is assembled progressively in conjunction with the placement of a peripheral side restraint jacket 30 formed of concrete in which no provision is made either for reinforcement or prestressing cables. The function of said side restraint jacket is to provide reinforcement for the lining membrane while also serving to contain the ducts through which water is circulated for cooling the membrane. Provision is made between the peripheral side restraint jacket 30 and the annuli of the outer concrete layer for an annular space having a radial width of the order of one meter for the purpose of accommodating the second concrete layer. Heat-insulating material (not shown) can also be mounted at the same time against the lining membrane $15_c$.

Construction proceeds in a manner which is similar to the sequence of operations described in reference to FIG. 4. The outer concrete layer is stopped at a level 32 which is slightly higher than that of the top face of the lining membrane and the peripheral side restraint jacket 30 is stopped at a lower level which is so determined that the remainder of the lining membrane retains sufficient inherent strength and rigidity.

During this phase of assembly, all of the horizontal prestressing cables $18_c$ (first-stage cables) and $18'_c$ (second-stage cables) are placed in position within the outer concrete layer. Once each annulus has set to a sufficient extent, the corresponding cables $18_c$ are subjected to tension in such a manner as to apply an initial prestress in the outer concrete layer alone.

Once the outer concrete layer has reached level 32, the cables $10_c$ are stopped at this level and subjected to tension. The lifts of the inner layer are placed in turn one above the other. In this case also, tension is progressively applied to the cables $18'_c$ as the construction proceeds in order to effect the second-stage prestressing. It would also be possible to apply additional tension to the cables $18_c$.

Once the fabrication of the inner layer is completed, the upper end slab $20_c$ is placed in turn and prestressed by means of the cables $22_c$ whilst the vertical prestressing cables $10'_c$ are subjected to tension after the two concrete layers have been bonded. In order to provide an additional second-stage vertical prestress in the corner junctions in which the internal pressure has a tendency to open the vessel, provision is accordingly made for short cables 36, as shown in FIG. 8.

It is apparent that the horizontal prestressing cables cannot be placed opposite to the circulator duct openings 38 (shown in FIG. 7). On the other hand, the horizontal distance between the groups of cables $18_c$ and $18'_c$ is reduced in the vicinity of said duct openings and the proportion of first-stage prestressing cables $18_c$ is increased.

A similar problem arises at the level of the opening 40 which is provided for the graphite moderator bricks. Ducts or tubes for accommodating second-stage prestressing cables can be disposed opposite to said opening 40 inasmuch as this latter is sealed off after positioning of the graphite. On the other hand, the proportion of first-stage prestressing cables is increased in the vicinity of these openings as shown in FIG. 8.

The following numerical data, which are given by way of example, correspond to a reactor vessel in which is formed an internal chamber 40 meters in height and 20 meters in diameter and which, under operating conditions, contains gas at a pressure of 50 bars (725 p.s.i.), the internal face of the concrete wall being brought to an average temperature of 60° C. The lateral wall can thus comprise an outer concrete layer and an inner concrete layer which are both 2 meters in thickness and subjected to the following prestressing forces:

Vertical prestressing:
  First stage _____ 50,000*t*
  Second stage _____ 150,000*t*
Horizontal prestressing (per linear meter in height):
  First stage _____ 2,000*t*
  Second stage _____ 8,000*t*

We claim:
1. A prestressed concrete pressure vessel comprising a monolithic concrete body, part of which at least comprises an inner layer and an outer layer surrounding said inner layer and prestressing means for subjecting said layers to a prestress the magitude of which exhibits an abrupt increase from the inner to the outer layer at the boundary therebetween.

2. A cylindrical pressure vessel in accordance with claim 1, wherein at least part of said vessel comprises more than two concentric layers which are subjected to prestresses, the magnitude of which increases at the boundary between each layer and the layer surrounding it.

3. A prestressed concrete pressure vessel as described in claim 1 having two concentric layers, first cables in said outer layer subject to permanent tensile forces and prestressing said outer layer and second cables in said inner layer subjected to permanent tensile forces and prestressing both of said layers.

4. A prestressed concrete pressure vessel as described in claim 1 including an annular space between said layers and a material filling said space securely joining said layers.

5. A pressure vessel in accordance with claim 1, including a cylinder wall and two closing end slabs, wherein only the cylinder wall consists of two concentric concrete layers which are subjected to different radial and longitudinal prestressing forces.

6. A pressure vessel in accordance with claim 5, wherein the means for radial prestressing of said cylinder wall consist in cables all of which are located in the outer layer.

7. A nuclear reactor comprising a reactor core, a heat exchanger, a chamber limited by a prestressed concrete pressure vessel and accommodating said core and said heat exchanger and means for circulating a pressurized hot coolant in said chamber along a closed path including said core and said heat exchanger, said vessel comprising a monolithic concrete body, a part of which at least comprises an inner layer and an outer layer surrounding said inner layer and prestressing means for subjecting said layers to prestress the magnitude of which exhibits an abrupt increase from the inner to the outer layer at the boundary therebetween, said prestress substantially balancing the tension stresses due to the coolant pressure and temperature along the outer periphery of said body and in a region intermediate the outer and inner peripheries of said body in part at least thereof.

References Cited

UNITED STATES PATENTS

| | | | |
|---|---|---|---|
| 2,808,851 | 10/1957 | James | 138—176 |
| 3,297,542 | 1/1967 | Costes | 176—60 |
| 3,349,524 | 10/1967 | Fistedis | 52—20 |

HENRY C. SUTHERLAND, Primary Examiner

J. L. RIDGILL, Jr., Assistant Examiner

U.S. Cl. X.R.

52—223, 249; 138—76; 176—60, 87; 264—228